United States Patent [19]

Barnes et al.

[11] Patent Number: 5,764,696

[45] Date of Patent: Jun. 9, 1998

[54] CHIRAL AND DUAL POLARIZATION TECHNIQUES FOR AN ULTRA-WIDE BAND COMMUNICATION SYSTEM

[75] Inventors: Mark A. Barnes, Madison; Larry W. Fullerton, Huntsville, both of Ala.

[73] Assignee: Time Domain Corporation, Huntsville, Ala.

[21] Appl. No.: 460,773

[22] Filed: Jun. 2, 1995

[51] Int. Cl.[6] .............................. H03K 7/04; H03K 7/06; H03K 9/04; H03K 9/06

[52] U.S. Cl. .............................. 375/239; 370/205

[58] Field of Search .............................. 375/239, 299, 375/267; 370/205, 212

[56] References Cited

U.S. PATENT DOCUMENTS

| | | | |
|---|---|---|---|
| 3,921,171 | 11/1975 | Strother et al. | 343/16 |
| 4,266,201 | 5/1981 | Belfatto | 332/9 |
| 4,641,317 | 2/1987 | Fullerton | 375/1 |
| 4,710,944 | 12/1987 | Nossen | 375/40 |
| 4,743,906 | 5/1988 | Fullerton | 342/27 |
| 4,813,057 | 3/1989 | Fullerton | 375/37 |
| 4,849,990 | 7/1989 | Ikegami et al. | 375/40 |
| 4,979,186 | 12/1990 | Fullerton | 375/23 |
| 5,363,108 | 11/1994 | Fullerton | 342/27 |
| 5,408,351 | 4/1995 | Huang | 359/186 |
| 5,519,400 | 5/1996 | McEwan | 342/28 |

FOREIGN PATENT DOCUMENTS 2609224  7/1988  France .

OTHER PUBLICATIONS

Skolnik: "Introduction to Radar Systwems", McGraw–Hill Book Company, Inc., New York 1962, pp. 301–312.
Patent Abstracts of Japan, vol. 8, No. 39 (E–228) [1476], Feb. 21, 1984.
Patent Abstracts of Japan, vol. 7, No. 247, (E–208) [1392], Oct. 2, 1983.

*Primary Examiner*—Stephen Chin
*Assistant Examiner*—Mohammad Ghayour
*Attorney, Agent, or Firm*—Sterne, Kessler Goldstein & Fox P.L.L.C.

[57] ABSTRACT

Chiral and dual polarization techniques for an ultra-wide band communication system provide an ultra-wide band signal having signal components in two dimensions. The polarization techniques utilize two signal paths to excite a pair of linear, orthogonal antennas. The pulses transmitted along one signal path are delayed with respect to the pulses transmitted along the second signal path such that one antenna is excited with a pulse that is out of phase with respect to the pulse that is exciting the other antenna. With chiral polarization, one signal is delayed in time by an amount such that it reaches a maximum when the other signal is at an adjacent minimum. With dual polarization, one signal is delayed by more than a pulse width. Because the signal is split and transmitted using two orthogonal, linear antennas, the transmitted signal has an electric field component in two dimensions. Because the signal in one signal path is delayed, the transmitted signal, the transmitted signal appears to rotate about the axis of propagation in the right-hand or left-hand direction (depending on the orientation of the antennas relative to one another and on which signal path is delayed). Because chiral and dual polarized signals have signal components in two dimensions, they can be received by receiver systems using either a single linear antenna, or a pair of orthogonal, linear antennas.

28 Claims, 9 Drawing Sheets

FIG. 1
(CONVENTIONAL)

FIG. 2
(CONVENTIONAL)

FIG. 3A
(CONVENTIONAL)

FIG. 3B
(CONVENTIONAL)

CHIRAL AND DUAL POLARIZATION TECHNIQUES FOR AN ULTRA-WIDE BAND COMMUNICATION SYSTEM

BACKGROUND OF THE INVENTION

1. Field of the Invention

The present invention relates generally to polarization techniques, and more specifically to polarization techniques ideally suited to an ultra-wideband communications system.

2. Related Art

Conventional narrow band communication systems use a variety of polarization techniques for signal transmission. One polarization technique that is particularly well suited to narrow band communications is circular polarization. With circular polarization, the signal is transmitted as simultaneous sinusoids on two orthogonal linear antennas. The manner of transmission is such that one antenna transmits a signal that is identical to, but 90 degrees out of phase with respect to the signal transmitted by the other antenna.

Circular polarization reduces the polarization effects of linear receive antennas, thus reducing detrimental effects brought about by changes in the location and orientation of the antenna. Thus, for narrow band systems, circular polarization can reduce limitations on the users' movements. Additionally, using right- and left-handed polarization, circular polarization can be used to create orthogonal channels. Circular polarization can also be used to allow an increase in the actual power transmitted where a maximum electric field limit is specified, such as by FCC regulations.

Another advantage of circular polarization for narrow band systems is in radar applications. With linear polarization, radar detection systems may fail to detect a linear object, such as a metal pipe, that is oriented perpendicular to the antenna. However, with circular polarization, linear objects can be detected by a narrowband radar system regardless of their orientation (except where the orientation is 'end-on').

Ultra-wide band communication systems, which utilize very short pulses to transmit information, can not utilize circular polarization to provide the same benefits, and overcome similar communications problems as described above for narrow band systems. Therefore, what is needed is a polarization technique for improving signal transmission and reception in ultra-wide band communication systems.

SUMMARY OF THE INVENTION

The present invention is directed toward a system and method for implementing dual or chiral polarization.techniques with ultra-wide band communication systems utilizing pulse-position modulation to transfer information. According to the invention, two alternative polarization techniques are provided: dual polarization and chiral polarization. In one embodiment, both polarization techniques utilize two signal paths in the transmitter/receiver and a splitter/combiner to create or receive the signals on each of the two paths. Each path is connected to a linear antenna to transmit or receive the signal on that path, and the two linear antennas are oriented approximately ninety degrees with respect to each other (i.e., they are orthogonal). For the purpose of this patent document, one antenna is said to be oriented along the x-axis and the other along the y-axis.

With both polarization techniques, the pulses transmitted along one signal path are delayed with respect to the pulses transmitted along the second signal path. With chiral polarization, one signal is delayed in time by an amount such that it reaches a maximum when the other signal is at an adjacent minimum. With dual polarization, one signal is delayed by more than a pulse width.

With both dual and chiral polarization, the transmitted signal has an electric field component in both the X and Y directions. Because the signal in one signal path is delayed, the transmitted signal appears to rotate about the axis of propagation in the right-hand or left-hand direction (depending on the orientation of the antennas relative to one another and on which signal path is delayed).

Chiral and dual polarized signals can be received by receiver systems using either a single linear antenna, or a pair of orthogonal, linear antennas. When using a pair of orthogonal, linear antennas, the signal received by one of the antennas is delayed to compensate for the delay introduced into one of the signal paths by the transmitting station. Both the delayed and the non-delayed received signal are combined and provided to an ultra-wide band receiver.

One advantage of the invention is that the electric field of the transmitted signal has a component in more than one dimension. As a result, the signal can be received by a single linear antenna regardless of its polarization. It should be noted that when received by a linear antenna, chiral polarization has a larger and more consistent output than dual polarization.

Also, reception of the signal is less prone to degradation as a result of changes in location of the receive antenna.

Another advantage of the invention is that orthogonal channels can be implemented by using right-handed and left-handed polarization.

Still another advantage of the invention is that dual or chiral polarization can be used with ultra-wide band radar applications to detect linear targets independent of their orientation.

Further features and advantages of the present invention, as well as the structure and operation of various embodiments of the present invention, are described in detail below with reference to the accompanying drawings.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

3

DETAILED DESCRIPTION OF THE EMBODIMENTS

Overview and Discussion of the Invention

The present invention is directed toward polarization techniques for ultra-wide band communication systems utilizing pulse-position modulation to transfer information. According to the invention, two polarization techniques are provided: dual polarization and chiral polarization. Both polarization techniques utilize two signal paths and a splitter/combiner to create or receive the signals on each of the two paths. Each path is connected to a linear antenna to transmit or receive the signal on that path, and the two linear antennas are oriented ninety degrees with respect to each other.

With both polarization techniques, the pulses transmitted along one signal path are delayed with respect to the pulses transmitted along the second signal path. With chiral polarization, one signal is delayed in time by an amount such that it reaches a maximum when the other signal is at an adjacent minimum. With dual polarization, one signal is delayed by more than a pulse width.

2. Example Environment

Ultra-wide band communication systems utilize a series of short pulses to transmit information. Information is modulated onto the pulsetrain by varying the period at which the pulse occurs. Such pulse modulation is referred to as dithering. An example of such an ultra-wide band communication system is the impulse communication system described in U.S. Pat. Nos. 4,641,317, 4,743,906, 4,813,057 4,979,186 and 5,363,108. Each of these U.S. Patents is incorporated herein by reference, as if reproduced in full below.

The present invention is described in terms of such an ultra-wide band communication system. Description in these terms is provided for convenience only. It is not intended that the invention be limited to application in this example environment. In fact, after reading the following description, it will become apparent to a person skilled in the relevant art how to implement the invention in alternative environments.

3. Circular Polarization

In a narrow band communication system, relative band width is defined as the ratio between the band width of the signal to the center frequency. A narrow band communication system uses a relative band width of less than 10%. To a close approximation, such a signal can be modeled as a sine wave. Based on this approximation, a signal having

4 circular polarization can be generated by splitting the output signal of a narrow band transmitter, shifting one of the two resultant signals by 90° and transmitting the two signals by a pair of orthogonal, linear antennas.

Figure 1:
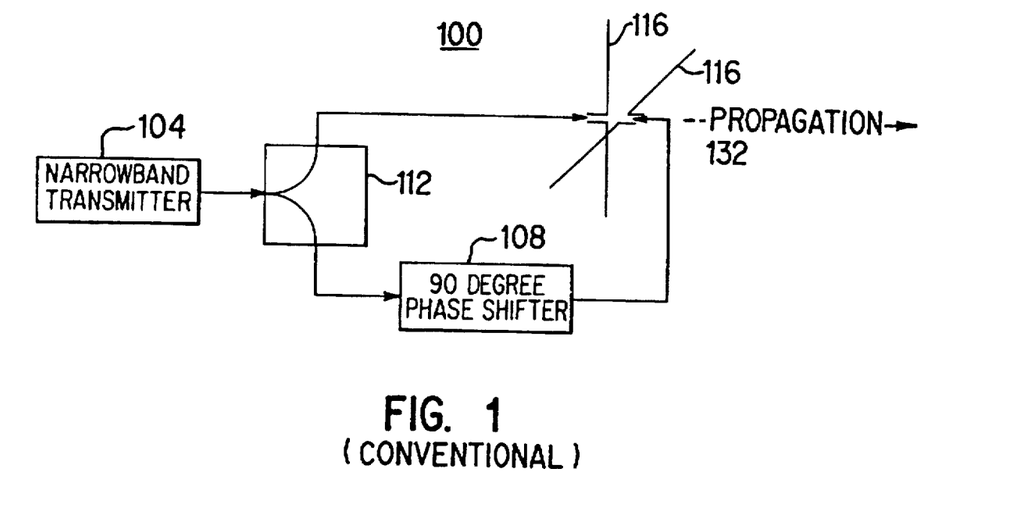
FIG. 1 is a block diagram illustrating a narrow band communication system.

FIG. 1 is a block diagram illustrating a narrow band circular polarization at transmitter 100. Narrow band circular polarization transmitter 100 includes a narrow band transmitter 104, a splitter 112, a 90° phase shifter 108, and a pair of orthogonal, linear antennas 116. In operation, narrow band transmitter 104 produces the narrow band signal. As stated above, this narrow band signal can be approximated as a sine wave. The narrow band signal provided by narrow band transmitter 104 is split by a splitter 112 to produce two narrow band signals.

Each of the two resultant signals at the output of splitter 112 are identical to the input signal but at approximately one-half the power. One of these two output signals is shifted 90° with respect to the other signal by 90° phase shifter 108. The delayed and non-delayed signals are used to excite two orthogonal linearly polarized antennas. The net effect is an electric field that appears to rotate along the axis of propagation 132 like a cork screw.

Figure 2:
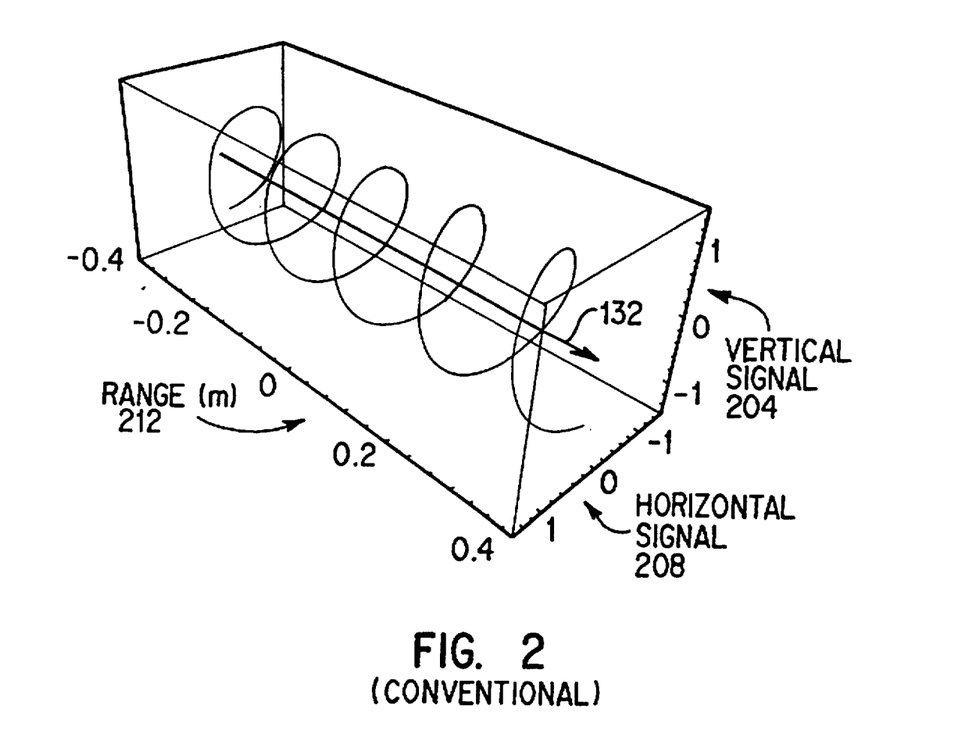
FIG. 2 is a parametric plot illustrating the electric field of a circular polarized narrow band signal.

A parametric plot of a circularly polarized signal is provided in FIG. 2. FIG. 2 illustrates the vertical signal 204 component and the horizontal signal 208 component along propagation direction 132 as a function of the range 212. As shown in FIG. 2, the electric field rotates about propagation axis 132 in the propagation direction. Depending on the orientation of linear antennas 116 with respect to each other, the polarization of this circularly polarized signal can be right-handed or left-handed. Illustrated in FIG. 2 is a right-handed circularly polarized signal.

Figure 3A:
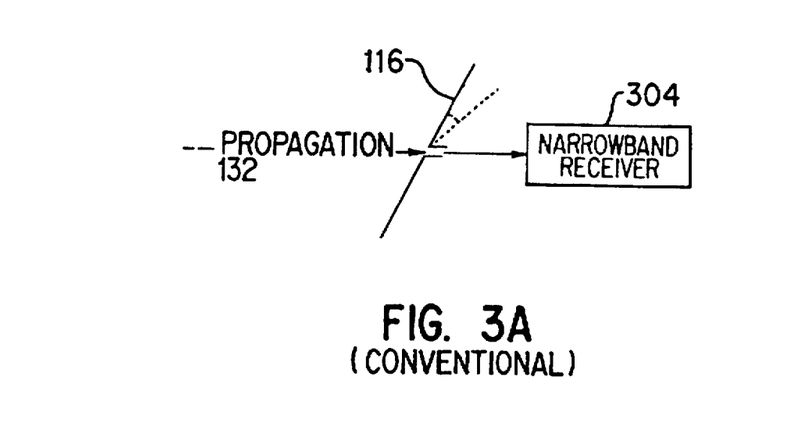
FIG. 3A is a block diagram illustrating a narrow band communication receiver having a single linear antenna.
Figure 3B:
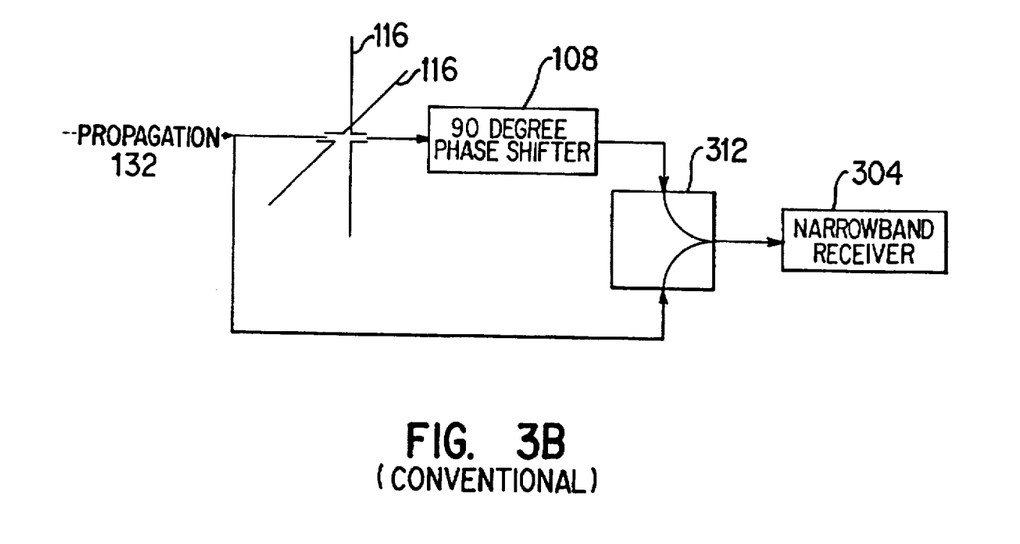
FIG. 3B is a block diagram illustrating a narrow band communication receiver having a circular polarized antenna.

Because the circularly polarized signal rotates completely about the axis of propagation 132, this signal can be received by a linear or a circular polarization receiver. FIGS. 3A and 3B illustrate a linear receiver and a circular polarization receiver, respectively. The linear receiver illustrated in FIG. 3A simply includes a single linearly polarized antenna 116 and a narrow band receiver 304. The circular polarization receiver includes two orthogonal linear antennas 116, a 90° phase shifter 108, a combiner 312, and a narrow band receiver 304. With the circular polarization receiver, the signal received by one of the linear antennas 116 is shifted by 90° using 90° phase shifter 108. The shifted signal is combined with the signal received by the other linear antenna 116 using combiner 312. The resultant combined signal is provided to narrow band receiver 304.

In contrast to the narrow band communication system, the signal in an ultra-wide band communication system cannot be approximated as a sine wave. Instead, the ultra-wide band communication system transmits and receives information using a series of narrow pulses. Information is modulated onto the signal by pulse position modulation. As such, the techniques described above for circular polarization cannot be applied to the ultra-wide band communication system signal. Therefore, in order to achieve for the ultra-wide band communication system benefits that are analogous to those provided by circular polarization to a narrow-band system, the inventors have developed chiral and dual polarization techniques for the ultra-wide band communication system.

4. Ultra-wide band Dual and Chiral Polarization

Figure 4:
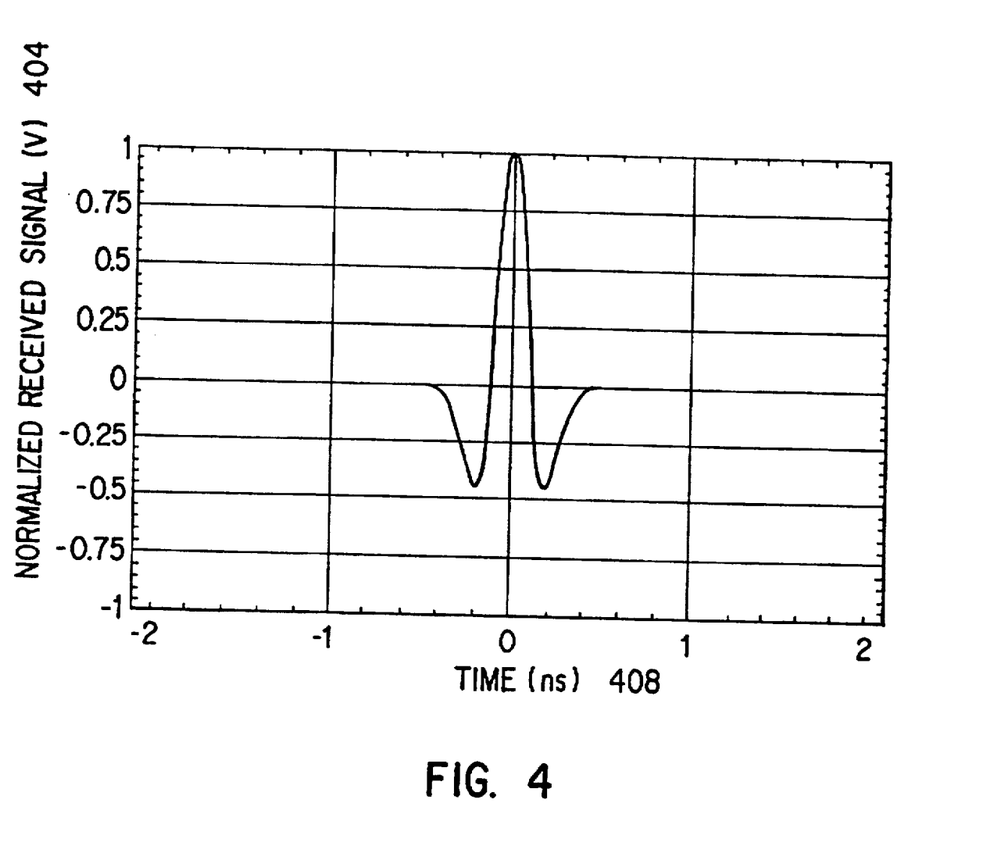
FIG. 4 is a plot illustrating a received ultra-wide band signal.

The ultra-wide band signal received by an ultra-wide band receiver is referred to as a triplet. The triplet can be approximated by the following:

$$V_{trip}(t) = (1 - 2 \cdot (\pi f_c t)^2) \cdot e^{-(\pi f_c t)^2}$$

where t is time and $f_c$ is the center frequency of the received signal. A theoretical waveform for an ultra-wide band signal having a 2 GHz center frequency is illustrated in FIG. 4. FIG. 4 illustrates normalized received signal strength in volts (v) 404 as a function of time (in nanoseconds) 408.

Figure 5A:
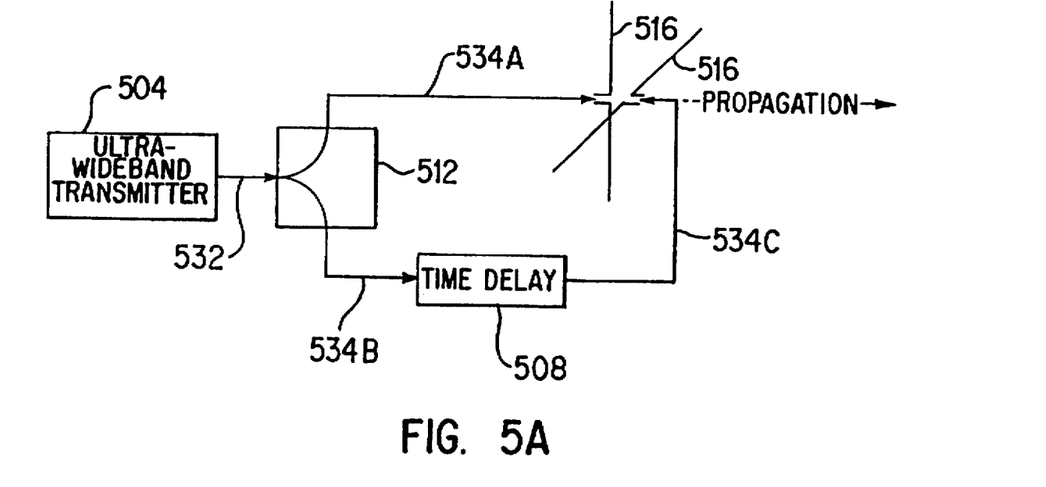
FIG. 5A is a block diagram illustrating an ultra-wide band communication system for implementing dual or chiral polarization techniques using a transmitter, a splitter and a delay device according to one embodiment of the invention.

The chiral polarized signal can be described as having two signal components: an x component and a y component. The two signal components can be written as follows:

$$\hat{x}v_{trip}(t) = \hat{x}(1-2\cdot(\pi t f_c)^2)\cdot e^{-(\pi t f_c)^2}$$

$$\hat{y}v_{trip}(t-t_d) = \hat{y}(1-2\cdot(\pi(t-t_d)f_c)^2)\cdot e^{-(\pi(t-t_d)f_c)^2}$$

where $\hat{x}$ and $\hat{y}$ are unit vectors along the x and y axis, respectively and $t_d$ represents the delay introduced by delay device 508.

The received signal is a function of the polarization of the receive antenna and on the two components of the chiral polarized signal. Specifically, the received signal can be approximated as the vector dot product of the polarization of the receive antenna and the chiral polarized signal as follows:

$$v_r(t,t_d,\hat{p}) = \hat{p} \cdot [\hat{x}v_{trip}(t) + \hat{y}v_{trip}(t-t_d)]$$

$$= (1-2\cdot(\pi t f_c)^2)\cdot(\cos(\theta)e^{-(\pi t f_c)^2} + \sin(\theta)e^{\pi t f_c)^2})$$

where p is the polarization of the receive antenna, $t_d$ is the delay between the excitation of the two orthogonal transmit antennas, and $\theta$ is the polarization angle between the transmit and receive antennas.

A system for transmitting an ultra-wide band signal using dual or chiral polarization according to one embodiment is illustrated in block diagram form in FIG. 5A. The system comprises an ultra-wide band transmitter 504, a time delay device 508, a splitter 512 and two orthogonal linear antennas 516.

Figure 6:
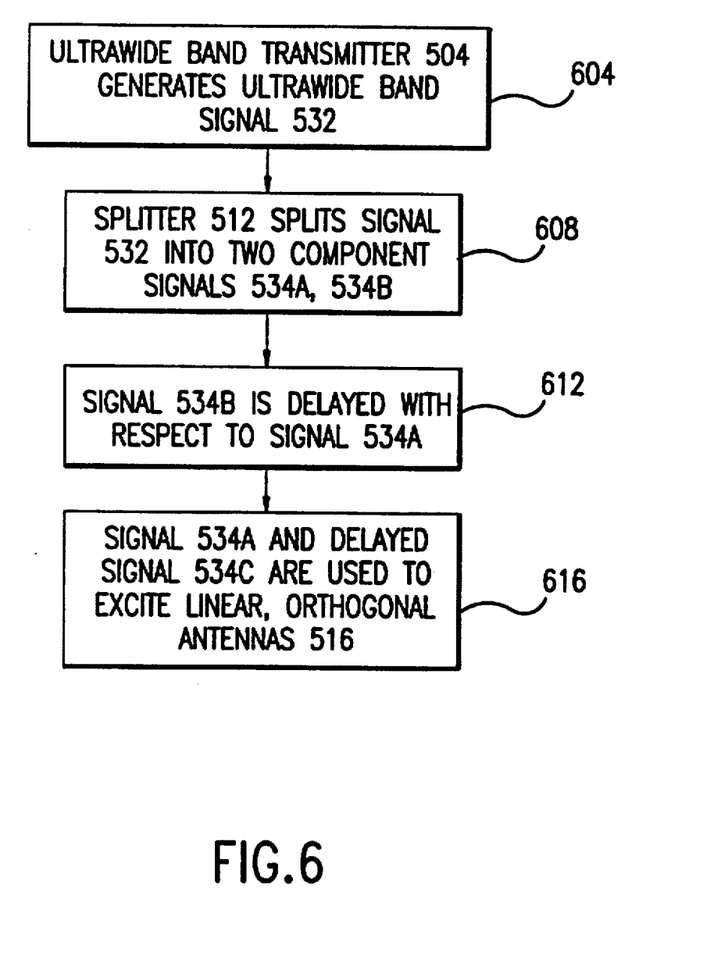
FIG. 6 is an operational flow diagram illustrating the operation of the ultra-wide band communication system illustrated in FIG. 5A.

The operation of the ultra-wide band transmission system is illustrated in flow-chart form in FIG. 6. In a step 604, ultra-wide band transmitter 504, generates an ultra-wide band signal 532. Ultra-wide band signal 532 includes information modulated using pulse position modulation.

In a step 608, splitter 512 splits ultra-wide band signal 532 into two signals labelled 534A and 534B. In a step 612, signal 534B is delayed with respect to signal 534A using time delay device 508. The amount of delay introduced by time delay device 508 depends on whether the polarization is chiral or dual. For chiral polarization, signal 534B is delayed by an amount such that signal 534C reaches a maximum when signal 534A is at an adjacent minimum. For a 2 GHz center frequency, this corresponds to a delay of 0.1125 ns (nanoseconds) (see FIG. 4). For dual polarization, signal 534B is delayed by an amount greater than a pulse width. For the 2 GHz center frequency, this corresponds to 0.5 ns.

Time delay device 508 can be implemented using any of a number of delay techniques. In one embodiment, time delay device 508 is implemented by adjusting the relative cable lengths of the cables on which signals 534A, 534B are carried. By implementing the cable that carries signal 534B as a longer length than the cable carrying signal 534A, the signal 534B is delayed with respect to signal 534A. The amount of delay depends on the amount of additional cable length over which signal 534B must travel.

Splitter 512 is implemented in one embodiment as a reactive low-loss 0°-180° hybrid splitter. One example of such a splitter 512 is the commercially available 4-183-4 splitter, available from M/A-Comm in Burlington, Mass., USA. If implemented using a reactive splitter, splitter 512 can be used as a combiner for receive operations with a 3 dB insertion loss. Note that if additional power gain is required, low noise amplifiers can be inserted prior to the power combiner (splitter 512) on the receive antenna to compensate for the combiner's 3 dB insertion loss.

In a step 616, signal 534A and delayed signal 534C are used to excite orthogonal linear antennas 516 to transmit a chiral or dual polarized signal.

In yet another embodiment, two tightly controlled transmitters 504 can be used to generate the dual or chiral polarized signal. In this embodiment, illustrated in FIG. 5B, a controller 544 controls two separate ultra-wide band transmitters 504. Each transmitter 504 provides a signal to the dual or chiral antenna. In this embodiment, the signal rotation is controlled by controlling the time at which one transmitter 504 triggers relative to the other transmitter to achieve the same results.

Figure 5B:
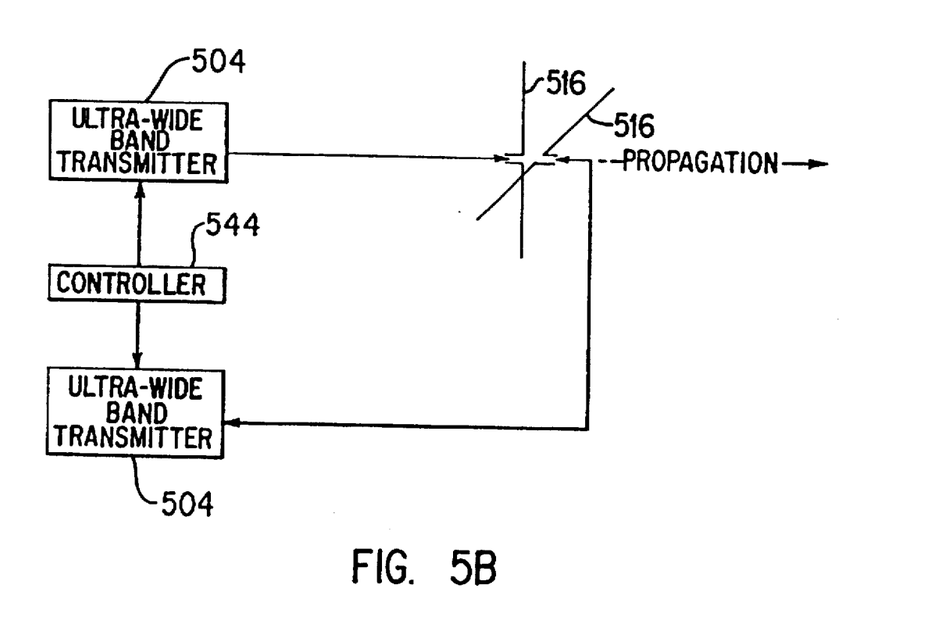
FIG. 5B is a block diagram illustrating an ultra-wide band communication system for implementing dual or chiral polarization techniques using two transmitters according to one embodiment of the invention.

In the embodiments illustrated in FIGS. 5A and 5B, two orthogonal linear antennas are used to transmit the dual and chiral polarized signals. It should be noted that due to reciprocity, a linear antenna 516 can be used to transmit the dual or chiral signal and a dual or chiral antenna (i.e., two orthogonal linear antennas 516) can be used to receive the signal while still reaping the same benefits of the dual or chiral polarized signal.

A basic difference between dual polarization and chiral polarization is the amount of delay introduced by time delay device 508. To reiterate, for a dual polarization, signal 534B is delayed by an amount greater than a pulse width; for chiral polarization, signal 534B is delayed by an amount that is less than a pulse width but that is such that signal 534A reaches a maximum when signal 534A is at an adjacent minimum. The resultant signal pattern for the dual polarization signal is quite different from that of the chiral polarized signal.

Both dual polarization and chiral polarization can be configured to transmit signals in isolated channels. Both polarization techniques can be implemented such that information can be transmitted in orthogonal channels. These orthogonal channels are right-hand polarized and left-hand polarized channels. The relative orientation of the orthogonal, linear antennas 516 with respect to each other dictates whether the signal will be right-hand or left-hand polarized as this orientation dictates the direction in which the electric field appears to rotate with respect to the direction of propagation. One way to effect a change in the direction of rotation is to rotate one of the dipoles 116 180 degrees to effectively change the sign of its transmission. The relationship between right-handed and left-handed polarization can be illustrated by the following two equations:

$$E_{trh}(t,t_d,\hat{p}) = \hat{x}E_{mono}(t) + \hat{y}E_{mono}(t-t_d)$$

$$E_{tlh}(t,t_d,\hat{p}) = \hat{x}E_{mono}(t) - \hat{y}E_{mono}(t-t_d)$$

where $E_{trh}$ is the transmitted right-hand electric field, $E_{tlh}$ is the transmitted left-hand electric field, $E_{mono}$ is the electric field transmitted by a linear antenna 116, $t_d$ is the time delay introduced by time delay device 508, t is time, where $\hat{x}$ and $\hat{y}$ are the x-axis unit vector and the y-axis unit vector, respectively.

In an alternative embodiment, the direction of rotation of the dual or chiral polarized signal can be changed by altering the implementation of splitter 512. Where splitter 512 has inverting and non-inverting ports, either an inverting or a non-inverting port can be selected to provide the signal to signal path 534B. Changing the phase of the signal on signal path 534B with respect to the signal on signal path 534A has the effect of changing the direction of rotation of the transmitted signal.

Figure 7A:
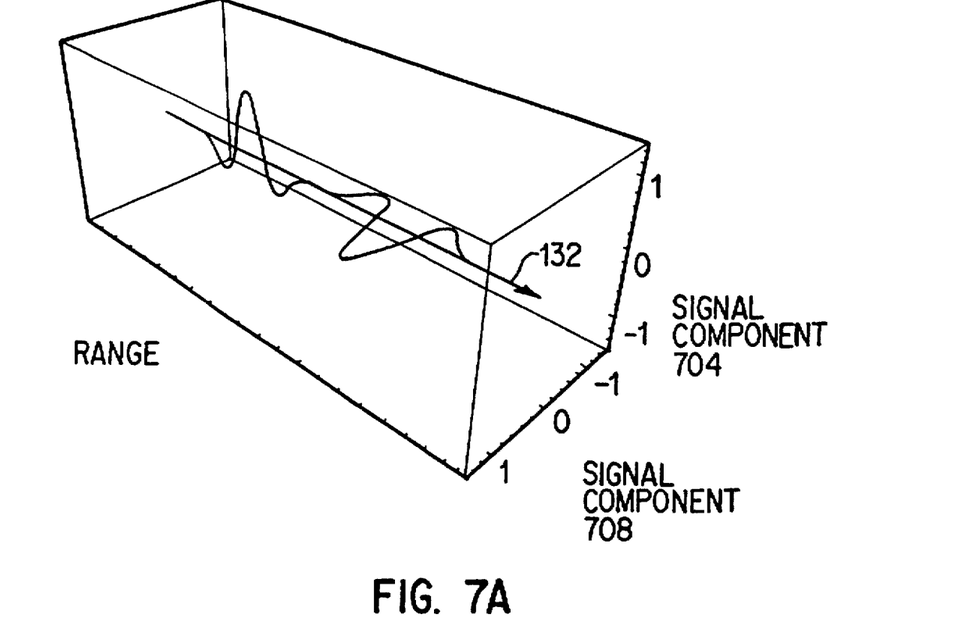
FIG. 7A is a parametric plot illustrating the electric field of a dual polarized ultra-wide band signal.

FIG. 7A is a parametric plot illustrating a signal pattern for a dual polarized signal; in particular a right-handed dual polarized signal is illustrated. As is illustrated in FIG. 7A, the energy in the dual polarized signal has two components: an x signal component 704 and a y signal component 708 as it travels in the propagation direction 132.

Figure 7B:
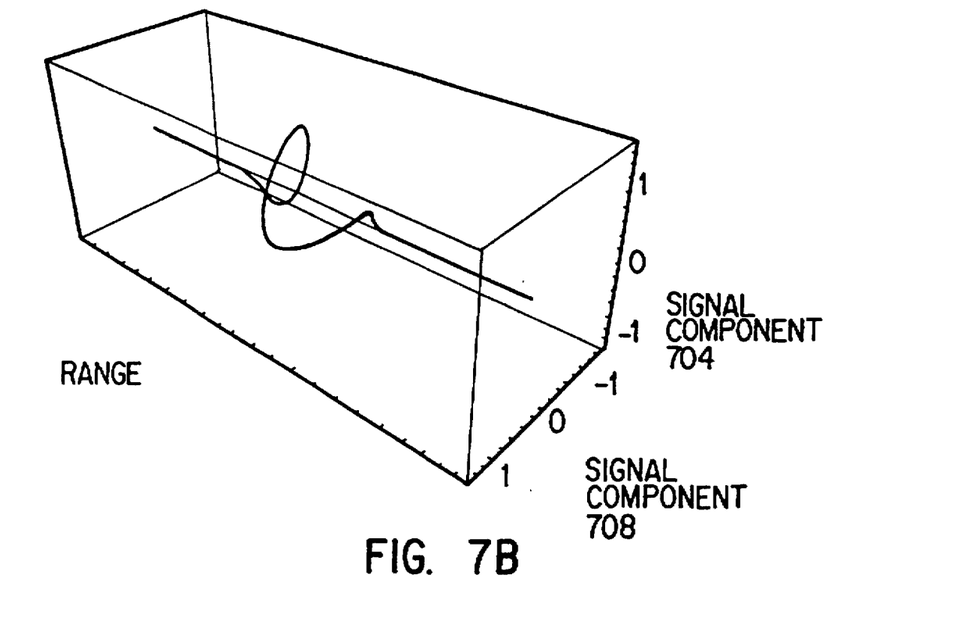
FIG. 7B is a parametric plot illustrating the electric field of a chiral polarized ultra-wide band signal.

FIG. 7B is a parametric plot illustrating a signal pattern for a chiral polarized signal; in particular, a right-handed chiral polarized signal is illustrated. As is illustrated in FIG. 7B, the energy in the chiral polarized signal has two components: an x signal component 704 and a y signal component 708 as it travels in the propagation direction 132.

Figure 8A:
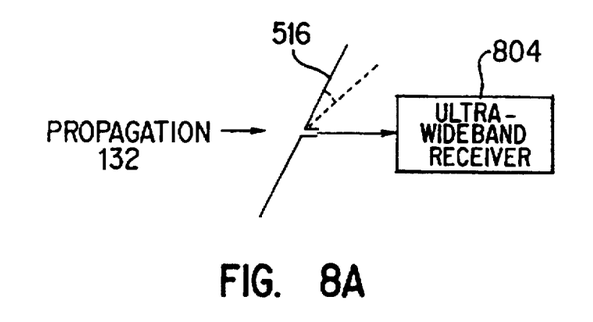
FIG. 8A is a block diagram illustrating an ultra-wide band communication receiver having a single linear antenna.
Figure 8B:
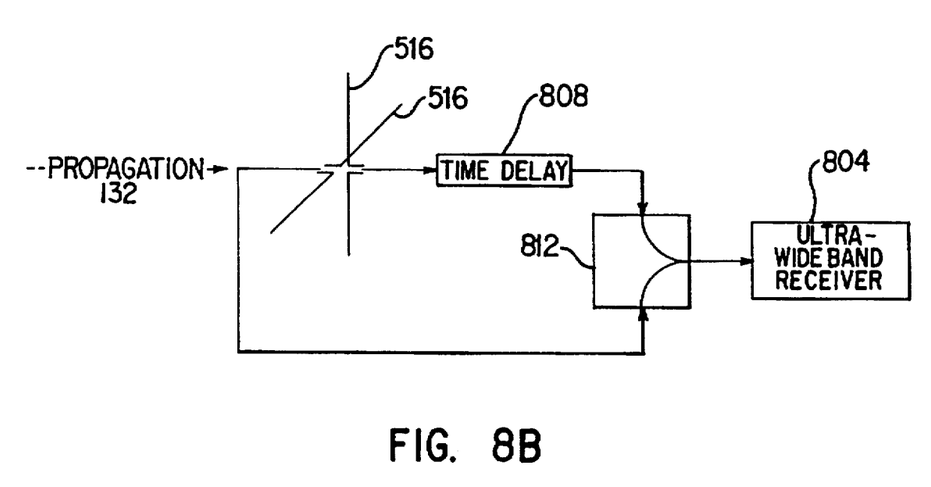
FIG. 8B is a block diagram illustrating an ultra-wide band communication receiver having a dual or a chiral polarized antenna.

Dual polarization and chiral polarization allow a linear polarized antenna to receive a signal independent of its polarization angle. FIGS. 8A and 8B are block diagrams illustrating examples of systems that can be used to receive a dual or chiral polarized signal. FIG. 8A illustrates an ultra-wide band linear receiver 804 that can receive a dual or chiral polarized signal. The linear receiver 804 is comprised of a single linear antenna and an ultra-wide band receiver 804.

FIG. 8B illustrates a dual/chiral receiver 804 that can receive a dual or chiral polarized signal. Receiver 804 is comprised of a pair of orthogonal, linear antennas 516, a time delay device 808, a combiner 812 and an ultra-wide band receiver 804. One antenna 516 is connected directly to ultra-wide band receiver 804. The received signal from one of the antennas 516 is fed through time delay device 808 to compensate for the delay introduced in time delay device 508 where the dual/chiral signal was generated.

Figure 9:
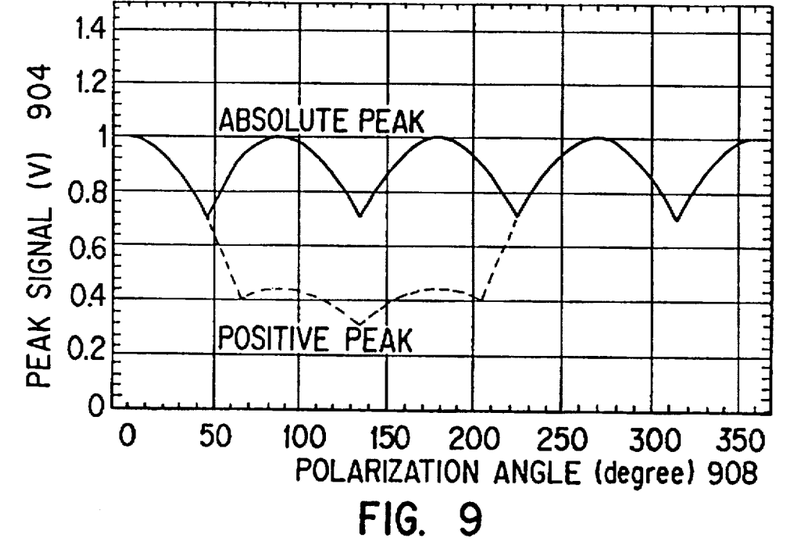
FIG. 9 is a plot illustrating the peak signal vs. polarization angle for a dual polarized ultra-wide band signal.

As stated above, dual polarization and chiral polarization allow a linear polarized antenna 516 to receive a signal independent of its polarization angle. FIG. 9 is a diagram illustrating the peak received signal 904, in volts, as a function of polarization angle 908 for a dual polarized signal. As is illustrated in FIG. 9, the absolute peak signal 904 never drops below 0.7 volts, regardless of the polarization angle 908 of the linear antenna 516. Of course, for polarization angles that are multiples of 90 degrees, the absolute peak is at a maximum.

Figure 10:
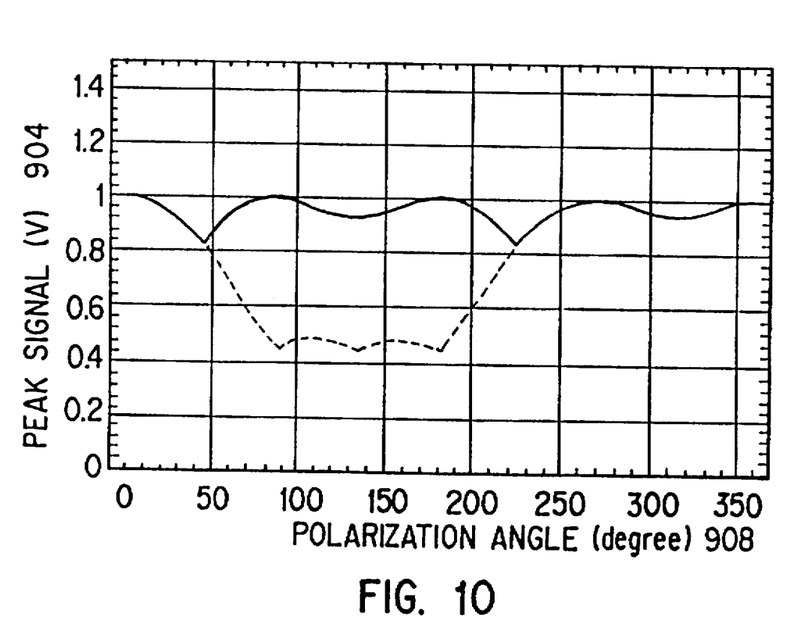
FIG. 10 is a plot illustrating the peak signal vs. polarization angle for a chiral polarized ultra-wide band signal.

FIG. 10 is a diagram illustrating the peak received signal 904, in volts, as a function of polarization angle 908 for a chiral polarized signal. As is illustrated in FIG. 9, the absolute peak signal 904 never drops below 0.8 volts, regardless of the polarization angle 908 of the linear antenna 516.

Figure 11:
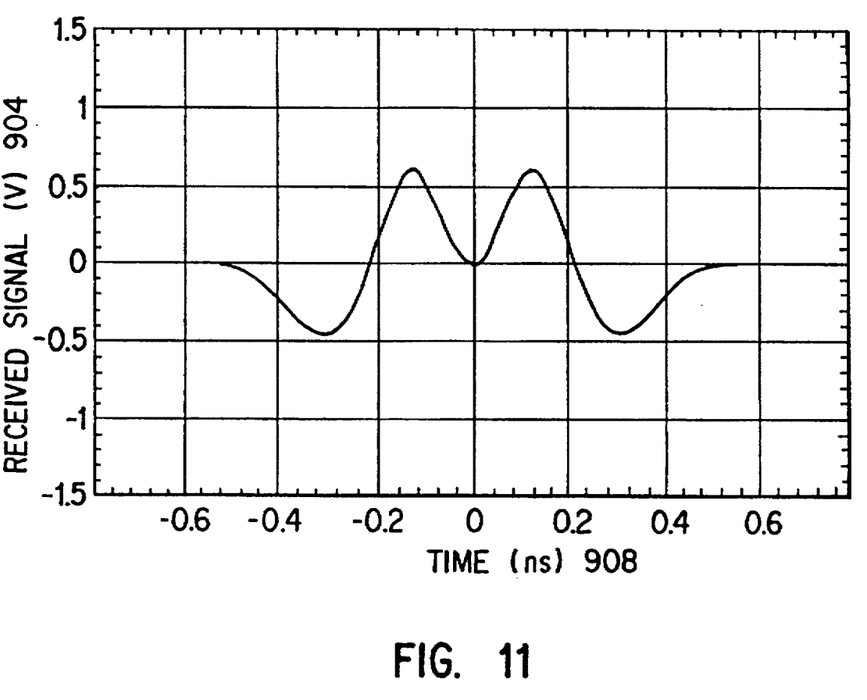
FIG. 11 is a plot illustrating a chiral signal received by a dual/chiral antenna with the delay applied to the wrong linear antenna

When a dual/chiral antenna (a pair of orthogonal, linear antennas 516) receives a dual or chiral signal, one polarization adds both vector components of the signal together while the other polarization subtracts them. Note that if delay is applied to the wrong signal component (or if the orientation of orthogonal linear antennas 516 is reversed), there is only partial destruction of the signals. A plot of a chiral signal received by a dual/chiral antenna with the delay applied to the wrong linear antenna 516 is illustrated in FIG. 11. As illustrated in FIG. 11, only partial destruction of the received signal results where delay is applied to the wrong linear antenna 516.

In certain applications the amount of signal power allowed is limited to a specified maximum for regulatory purposes. In such applications, dual or chiral polarization techniques can be implemented to allow more power to be transmitted than could otherwise be transmitted using linear polarization. One example of applications where power is regulated is with FCC Part-15 devices. Under FCC Part-15, the allowable power limit is regulated by the electric field received by a linear polarized antenna. To be part-15 qualified, the device is tested over a 1 MHz bandwidth above 1 GHz. An ultra-wide band signal passing through a 1 Mhz filter used for testing purpose produces a pulse of 1 μs duration (i.e., the pulse width is the reciprocal of the bandwidth). Where the nominal pulse repetition period used by the ultra-wide band communication system is shorter than this 1μs duration (such as with the impulse communication system described in the above-referenced U.S. Patents), the vertical and horizontal components will be coherent if the same trigger pulse is used to excite both linear antennas 516 as illustrated in FIG. 5.

As a result, a linear antenna 516 oriented at 45 degrees produces a maximum signal level in specified 1 MHz bands depending on the implementation parameters of the communication system such as the code sequence, pulse repetition rate, and center frequency. Because of vector addition, the net electric field will be $\sqrt{2}$ higher than just a single component (i.e., than a signal from a single linear antenna 516). Assuming a lossless combiner (or with preamplifiers added prior to the combiner), the signal received is double as compared to receiving only one component. Thus, when compared to linear polarization, the net effect of dual or chiral polarization is that the signal power can be doubled for the same electric field unit.

The chiral and dual polarization techniques described herein are also useful for other environments and applications. One such application is in radar systems. Conventional radar systems cannot detect linear objects, such as pipes, wires, re-bar, etc., that are oriented perpendicular to the linear antenna. However, a radar system using a dual or chiral polarized signal can detect a linearly polarized object regardless of its orientation (with the exception of course of an object oriented end-on which presents no appreciable cross-section in the radar plane).

3. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. An ultra-wide band communication system, comprising:

an ultra-wide band transmitter for generating an ultra-wide band signal;

a splitter for splitting said ultra-wide band signal into a first and second signal;

a time delay unit to delaying said second signal with respect to said first signal to provide a delayed signal; and first and second linear orthogonal antennas, said first antenna being excited by said first signal and said second antenna being excited by said delayed signal.

2. The system of claim 1, wherein said time delay means comprises a first transmission line for providing said first signal to said first antenna and a second transmission line for providing said second signal to said second antenna, wherein the relative lengths of said first and second transmission lines are such that said second signal is delayed with respect to said first signal.

3. The system of claim 1, wherein said time delay means comprises means for delaying said second signal by an amount such that said second signal reaches a maximum when said first signal is at a minimum.

4. The system of claim 1, wherein said time delay means comprises means for delaying said second signal with respect to said first signal by an amount that is greater than a pulse width of the ultra-wide band communication system.

5. The system of claim 1, wherein said splitter further comprises means for combining received ultra-wide band signals to provide a combined receive signal.

6. The system of claim 5, further comprising an ultra-wide band receiver for receiving said combined receive signal.

7. The system of claim 5, further comprising low noise amplifier means for amplifying said received ultra-wide band signals.

8. In an ultra-wide band communication system for transmitting information in an ultra-wide band signal by pulse position modulation of a series of narrow pulses, a method for transmitting the ultra-wide band signal comprising the steps of:
- splitting said ultra-wide band signal into first and second ultra-wide band signals;
- delaying said second signal with respect to said first signal to provide a delayed signal;
- exciting a first linear antenna with said first signal; and
- exciting a second linear antenna orthogonal to said first linear antenna with said delayed signal.

9. The method of claim 8, wherein said delay step comprises the steps of transmitting said first signal through a first transmission line and transmitting said second signal through a second transmission line, wherein the relative lengths of said first and second transmission lines are such that said second signal is delayed with respect to said first signal.

10. The method of claim 8, wherein said delay step comprises the step of delaying said second signal by an amount such that said second signal reaches a maximum when said first signal is at a minimum.

11. The method of claim 8, wherein said delay step comprises the step of delaying said second signal with respect to said first signal by an amount that is greater than a pulse width of the ultra-wide band communication system.

12. The method of claim 8, further comprising the step of combining received ultra-wide band signals to provide a combined receive signal.

13. An impulse communication system, comprising:
- a first ultra-wide band transmitter for generating a first ultra-wide band signal;
- a second ultra-wide band transmitter for generating a second ultra-wide band signal;
- a controller to control said first and second ultra-wide band transmitters such that said second ultra-wide band signal is delayed with respect to said first ultra-wide band signal; and
- first and second linear orthogonal antennas, said first antenna being excited by said first ultra-wide band signal and said second antenna being excited by said second ultra-wide band signal; and wherein
- said controller triggers said first and second ultra-wide band transmitters such that said second ultra-wide band signal reaches a maximum when said first ultra-wide band signal is at a minimum.

14. An impulse communication system, comprising:
- a first ultra-wide band transmitter for generating a first ultra-wide band signal;
- a second ultra-wide band transmitter for generating a second ultra-wide band signal;
- a controller to control said first and second ultra-wide band transmitters such that said second ultra-wide band signal is delayed with respect to said first ultra-wide band signal; and
- first and second linear orthogonal antennas, said first antenna being excited by said first ultra-wide band signal and said second antenna being excited by said second ultra-wide band signal; and wherein
- said controller triggers said first and second ultra-wide band transmitters such that said second ultra-wide band signal is delayed with respect to said first ultra-wide band signal by an amount that is greater than a pulse width of the ultra-wide band communication system.

15. In an impulse communication system for transmitting information in an ultra-wide band signal by pulse position modulation of a series of narrow pulses, a method for transmitting the ultra-wide band signal comprising the steps of:
- generating first and second ultra-wide band signals using first and second ultra-wide band transmitters;
- controlling said first and second ultra-wide band transmitters such that said second ultra-wide band signal is delayed with respect to said first ultra-wide band signal;
- exciting a first linear antenna with said first ultra-wide band signal; and
- exciting a second linear antenna orthogonal to said first linear antenna with said second ultra-wide band signal; and wherein
- said controlling step includes the step of triggering said first and second ultra-wide band transmitters such that said second ultra-wide band signal reaches a maximum when said first ultra-wide band signal is at a minimum.

16. In an impulse communication system for transmitting information in an ultra-wide band signal by pulse position modulation of a series of narrow pulses, a method for transmitting the ultra-wide band signal comprising the steps of:
- generating first and second ultra-wide band signals using first and second ultra-wide band transmitters;
- controlling said first and second ultra-wide band transmitters such that said second ultra-wide band signal is delayed with respect to said first ultra-wide band signal;
- exciting a first linear antenna with said first ultra-wide band signal; and
- exciting a second linear antenna orthogonal to said first linear antenna with said second ultra-wide band signal; and wherein
- said controlling step includes the step of triggering said first and second ultra-wide band transmitters such that said second ultra-wide band signal is delayed with respect to said first ultra-wide band signal by an amount that is greater than a pulse width of the ultra-wide band communication system.

17. An impulse communication system, comprising:
- an ultra-wide band transmitter for generating an ultra-wide band signal;
- a splitter for splitting said ultra-wide band signal into a first and second signal;
- a time delay unit to delay said second signal with respect to said first signal to provide a delayed signal; and
- first and second linear orthogonal antennas, said first antenna being excited by said second signal and said second antenna being excited by said delayed signal.

18. The system of claim 17, wherein said time delay unit comprises a first transmission line for providing said first signal to said first antenna and a second transmission line for providing said second signal to said second antenna, wherein the relative lengths of said first and second transmission lines are such that said second signal is delayed with respect to said first signal.

19. The system of claim 17, wherein said time delay unit comprises means for delaying said second signal by an amount such that said second signal reaches a maximum when said first signal is at a minimum.

20. The system of claim 17, wherein said time delay unit comprises means for delaying said second signal with respect to said first signal by an amount that is greater than a pulse width of the ultra-wide band communication system.

21. The system of claim 17, wherein said splitter further comprises means for combining received ultra-wide band signals to provide a combined receive signal.

22. The system of claim 21, further comprising an ultra-wide band receiver for receiving said combined receive signal.

23. The system of claim 21, further comprising low noise amplifier means for amplifying said received ultra-wide band signals.

24. In an impulse communication system for transmitting information in an ultra-wide band signal by pulse position modulation of a series of narrow pulses, a method for transmitting the ultra-wide band signal comprising the steps of:

splitting said ultra-wide band signal into first and second ultra-wide band signals;

delaying said second signal with respect to said first signal to provide a delayed signal;

exciting a first linear antenna with said first signal; and exciting a second linear antenna orthogonal to said first linear antenna with said delayed signal.

25. The method of claim 24, wherein said delay step comprises the steps of transmitting said first signal through a first transmission line and transmitting said second signal through a second transmission line, wherein the relative lengths of said first and second transmission lines are such that said second signal is delayed with respect to said first signal.

26. The method of claim 24, wherein said delay step comprises the step of delaying said second signal by an amount such that said second signal reaches a maximum when said first signal is at a minimum.

27. The method of claim 24, wherein said delay step comprises the step of delaying said second signal with respect to said first signal by an amount that is greater than a pulse width of the ultra-wide band communication system.

28. The method of claim 24, further comprising the step of combining received ultra-wide band signals to provide a combined receive signal.

* * * * *